July 27, 1965 R. J. CASTEN 3,196,543
NAVIGATIONAL PLOTTER
Filed Feb. 28, 1962 2 Sheets-Sheet 2
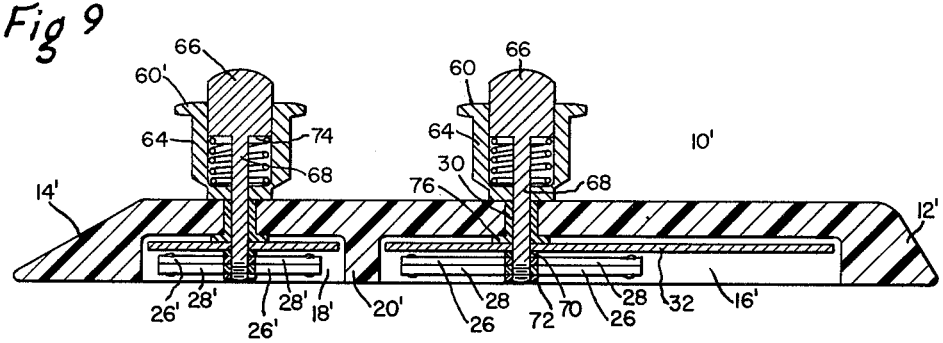
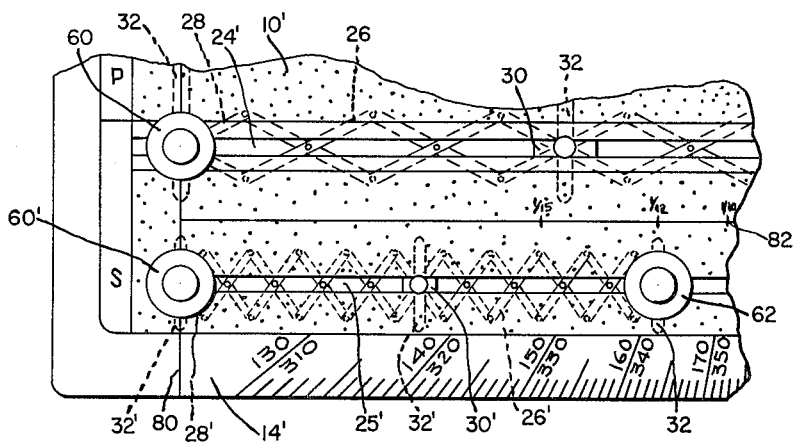
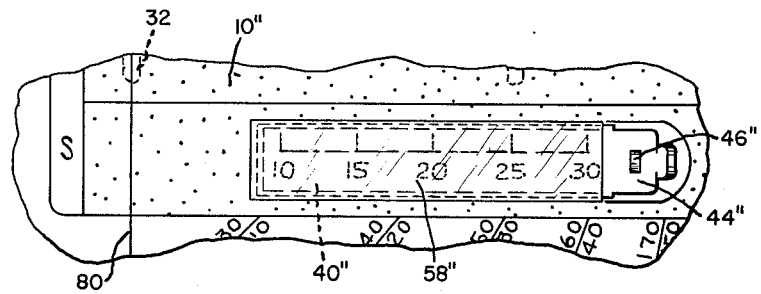
INVENTOR.
Ray J. Casten

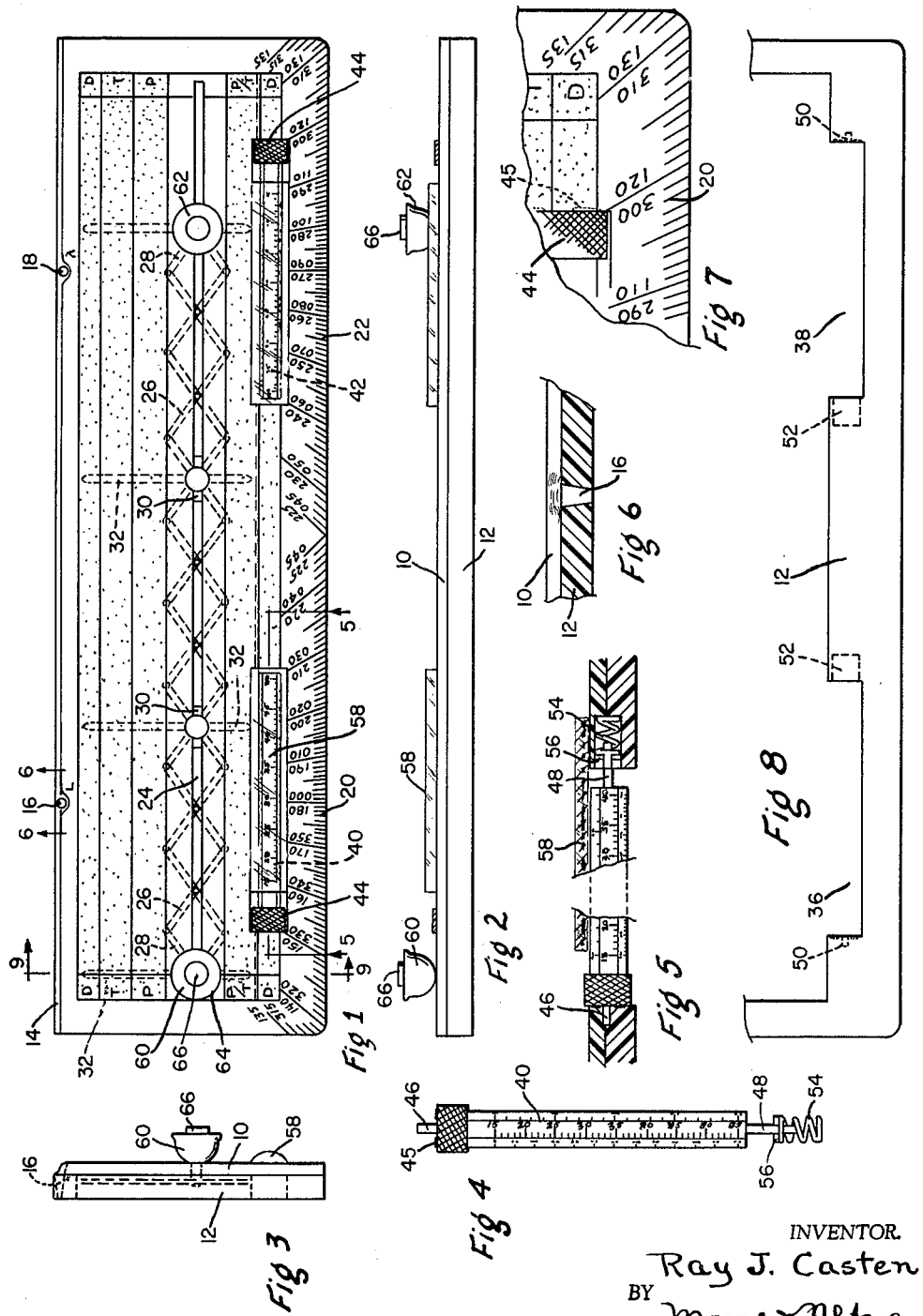

United States Patent Office

3,196,543
Patented July 27, 1965

3,196,543
NAVIGATIONAL PLOTTER
Ray J. Casten, Natick, Mass., assignor, by mesne assignments, to Faris Corporation, Natick, Mass., a corporation of Massachusetts
Filed Feb. 28, 1962, Ser. No. 176,222
2 Claims. (Cl. 33—75)

This invention relates to an instrument for facilitating the plotting of courses followed by a vehicle, such as a ship or aeroplane for the purpose of keeping track constantly of the present and future positions of the vehicle and of easily correcting errors in computing courses and speeds whenever recognizable objects such as navigational aids are sighted. The instrument hereinafter described is similar in many respects to that described and claimed in U.S. Patent No. 2,871,567, granted February 3, 1959, but has improved features which substantially increase its practical utility. To make the progress of the vehicle more evident on a chart, a series of movable pointers is provided on the instrument, the pointers being attached to joints in a lazy-tongs device and arranged to extend transversely of the instrument in both directions from the axis of the lazy-tongs device. As hereinafter explained, the upper ends of the pointers are to be used visually to follow the progress of the vehicle on a chart, then the lower ends of the pointers can be similarly used to check on further progress of the vehicle, thus doubling the effective length of the instrument. To facilitate the initial setting of the pointers, an auxiliary scale device is mounted in the instrument.

For a more complete understanding of the invention, reference may be had to the following description thereof, and to the drawing, of which FIGURE 1 is a plan view of an instrument embodying the invention;

FIGURE 2 is a side elevational view of the same;

FIGURE 3 is an end elevational view of the same;

FIGURE 4 is an elevation, on a larger scale, of one of the auxiliary scale devices shown in FIGURE 1;

FIGURE 5 is a section on the line 5—5 of FIGURE 1, on a larger scale;

FIGURE 6 is a section on the line 6—6 of FIGURE 1, on a larger scale;

FIGURE 7 is a fragmentary plan view of a corner of the instrument, on an enlarged scale;

FIGURE 8 is a fragmentary plan view of the under member of the body of the instrument;

FIGURE 9 is a magnified sectional view of a modified form of the invention;

FIGURE 10 is a fragmentary plan view of a corner portion of the same, on a smaller scale; and FIGURE 11 is a fragmentary plan view of another modification.

An instrument embodying the invention and illustrated in FIGURES 1 to 8 comprises an elongated ruler of transparent synthetic resin material such as "Lucite" which can conveniently be made in two parts, namely, a top plate or table 10 secured by adhesives, fasteners, or both, to an under frame 12, about half of which is shown in FIGURE 8 of the drawing, or can be molded as an integral unit. The front edge of the ruler is preferably beveled, as at 14. In the margin along this edge are two tapered holes 16, 18 adapted to receive the point of a pointed instrument such as a sharpened lead-pencil to serve as a pivot about which to swing the ruler to a desired course on a chart. Cooperating with the hole 16 is a series of angle markings 20, and cooperating with the hole 18 is a series 22. The hole 16 and scale 20 are for use when laying the ruler on a course which is more northerly or southerly than easterly or westerly, the pencil point in the hole 16 being placed on one of the horizontal lines on a chart and the desired mark on the scale 20 being placed on the same line by turning the ruler about the pencil as a pivot. The hole 18 and scale 22 are used on any convenient vertical meridian line on a chart to lay the ruler on a course which is more easterly or westerly than northerly or southerly.

The top plate 10 has a slot 24 therethrough extending nearly to the ends of the plate and parallel to the long edges thereof. A lazy-tongs device is mounted under the plate 10, the device comprising links 26 of equal length joined to one another at their ends and mid points, the links 28 at the ends of the device being of half-length. A block 30 is slidably fitted in the slot 24 at each end of the lazy-tongs device and at each of a number of uniformly spaced joints between the ends. In the instrument illustrated on the drawing, a block is secured to every third joint where links 28 cross each other so that the links form a pattern of three similar diamonds between successive blocks, and the number of diamonds formed by the links between any two blocks 30 is a multiple of three. Secured to each block 30 is a pointer 32 extending transversely of the ruler. Each block maintains its pointer at right angles to the axis of the ruler. The pointers extend from the slot 24 as far as possible toward the front edge 14 of the ruler and far enough in the other direction to cooperate with scale devices hereinafter described.

To provide clearance for the links 26 and pointers 32 between the under side of the plate 10 and the chart on which the instrument is used, an under frame 12 is provided, this being of sufficient thickness for the purpose. Half of this frame is shown in plan in FIGURE 8 of the drawing, the other half being a plain semi-rectangle with the holes 16, 18 therein. The frame can be made separately from the plate 10 or as an integral unit therewith. In the portion of the under frame 12 which underlies the rear margin of the plate 10, that is, the portion shown in FIGURE 8, there are two inner recesses 36, 38 which underlie similar rectangular apertures in the plate 10 to accommodate two scale members 40, 42. Each of these scale members is preferably a hexagonal prism having six elongated plane faces on which are scale divisions corresponding to the scale usually employed on most charts. Each scale member has a knurled head 44 by which it can readily be adjusted rotatively to present to view the particular scale desired; small bosses 45 being formed on the end face of the head 44 to engage in shallow dimples in the opposing surface of the frame 12 to hold the scale member releasably in any of its positions of angular adjustment. The scale member 40 is for use in connection with courses which extend eastward or toward the right along the ruler. The scale 42 is for use in connection with courses extending westward or toward the left. The zero of the scale 40 is on a line with the pointer 32 at the extreme left end of the slot 24, and the zero of scale 42 is correspondingly located at the extreme right end of the slot 24. Each scale member is mounted for easy removal so that it can be replaced, if necessary, by another with different scale markings. For example, members with relatively large scale divisions will be used for charts for marine vessels, and members with smaller scale divisions will be used for faster moving aeroplanes. For this purpose short shafts 46, 48 project from the ends of each scale member to enter horizontal holes 50, 52 in the frame 12. The hole 52 is large enough and deep enough to receive a spring 54 which bears against a pin 56 through the shaft 58 to keep the shaft 46 in its hole 50. To facilitate reading the exposed scale on the scale member 40 or 42, as well as to protect these scale members, an elongated lens 58 may be mounted on the top of the plate 10 over each scale member.

The top surface of the plate 10 is frosted to receive pencil marks for various purposes such as indicating points of expected progress along the course.

At the ends of the lazy-tongs device are finger buttons 60, 62 which are spring-pressed to hold the device frictionally in any position of adjustment. When an easterly course is being laid out, the button 60 is placed at the left extremity of the slot 24, the scale member 40 is turned to expose a scale equal to the one on the chart which is being used, and the button 62 is moved to put the pointer which is the first one to the right of the button 60 opposite the scale division on the visible scale of the member 40 which represents the expected number of miles to be traveled in the time interval represented by the distance between successive pointers 32.

Each of the finger buttons comprises a cup 64 which bears on the top face of the ruler. A plunger 66 is slidably fitted on the cup 64 and normally projects above the top of the cup. A stem 68 projects down from the plunger 66 through the bottom of the cup 64, through one of the blocks 30, one of the pointers 32, a washer 70 and through overlapping ends of the links 28, a nut 72 being threaded on the lower end of the stem 68. A spring 74 is compressed between the under face of the plunger 66 and the bottom of the cup 64 to press the cup frictionally against the top of the plate 10 and to hold up the linkage and pointers below the plate 10. The blocks 30 each have flanges 76 which bear against the under face of the plate 10 and space the pointers 32 below the plate 10.

A modified form of the invention is illustrated in FIGURES 9 and 10. This comprises a ruler 10' which is preferably molded in one piece with a beveled front edge 12' and a beveled rear edge 14'. The ruler has two bottom recesses 16' and 18' extending nearly the entire length thereof and separated by a longitudinal rib 20' which strengthens the ruler. Two parallel slots 24', 25' of equal length extend lengthwise of the ruler over the recesses 16' and 18', respectively, the ends of the slots near each end of the ruler being in the same transverse line of reference. In the recess 16' is a lazy-tongs device consisting of links 26 of equal length joined to one another at their ends and mid points, the links 28 at the ends of the device being of half-length. A block 30 is slidably fitted in the slot 24' at each end of the lazy-tongs device and at each of a number of uniformly spaced joints between the ends, the structure of this lazy-tongs device being the same as that shown in FIGURE 1. The links 26 form a pattern of three similar diamonds between successive blocks 30. Secured to each block 30 is a pointer 32 extending transversely of the ruler. Each block maintains its pointer at right angles to the axis of the ruler.

Under the slot 25' is an auxiliary lazy-tongs device preferably consisting of two finger buttons 60', 62' at the ends of a series of crossed links 26' which are joined at their ends and mid points, the end links 28' of the series being of half length. There are preferably nine pairs of crossed links 26' which with the short end links 28' make a pattern of ten diamonds as indicated in FIGURE 10. Below each of the finger buttons 60', 62' is a block 30' slidably fitted in the slot 25', a transverse pointer 32' being secured to each block 30' to be maintained thereby at right angles to the long axis of the ruler. Midway between the buttons 60', 62' is a third block 30' and a transverse pointer 32' secured thereto. Thus the links 26' make a pattern of five similar diamonds between successive blocks 30', and the number of diamonds formed by the links 26' between any two of the blocks 30' is a multiple of five.

A fixed reference line 80 is marked on the ruler at the left ends of the slots 24', 25' and the pointers 32, 32' which are respectively under the buttons 60, 60' are normally aligned with this reference line as indicated in FIGURE 10, for east-bound courses. For west-bound courses, the buttons 62, 62' (the former not shown in FIGURE 10) are moved to the right-hand ends of the slots 24', 25' so that distances can be reckoned westward or toward the left from them.

In laying out an east-bound course on a chart, the pointers 32' are moved to agree with selected scale divisions on the mileage scale of the chart. E.g., on a large scale chart, the pointer under the button 60' may be put on the zero scale division, and the pointer under the button 62' may be put on the scale division indicating 10 miles. Then the distance between successive mid joints of the links 26' will represent a mile on that chart. Or if on a smaller scale chart the pointer under the button 62' is put on the scale division indicating 100 miles, each mid joint of the lazy-tongs would represent ten miles. Since most charts are made to one of a relatively small number of scales, marks 82 may be made at suitable distances from the zero line 80 equal to unit distances on charts made to certain standard scales. For example, the distance on the ruler from the line 80 to the point marked "1/10" can be equal to a unit distance on a chart made on a scale of 1 to 10,000 or a multiple of 10,000. In like manner, the point marked "1/12" can indicate a unit distance on a chart made on a scale of 1 to 12,000 or a multiple thereof. When such a chart is used, the button 62' can be set opposite the appropriate mark 82 without having to put the ruler on the chart scale. When the button 62' has thus been set, the other lazy-tongs device is adjusted to bring the pointer 32 which is next to the right from the button 60 in line with the point of the lazy-tongs device between the buttons 60' and 62' which represents the distance the vehicle is expected to travel in the time represented by the space between successive pointers 32.

A further modification of the invention is shown in FIGURE 11. A ruler 10" of clear plastic is in general similar to the ruler 10 shown in FIGURE 1 except for the recesses in which scale members are mounted. In the form of the invention shown in FIGURE 11, a shallow recess is provided near each end of the ruler to receive a thin strip 40" of metal, plastic or other suitable material on which is printed scale divisions similar to those on the chart which is to be used. A number of such strips are supplied, each having scale divisions corresponding to those on some chart which may be used. Over the trough is a lens 58" to magnify the indicia on the strip 40". For easy removal and replacement, the strip is provided with a finger tab 44" at one end, the tab having a hole which engages over a lug 46" to hold the strip accurately in place. The scale on the strip 40" is used just like the scales on the prismatic member 40 shown in FIGURES 1, 4 and 5.

I claim:
1. A navigational instrument comprising an elongated ruler with parallel long edges, said ruler having two longitudinal slots extending from near one end thereof to near the other end thereof and an elongated recess under each slot, a lazy-tongs device in each said recess comprising a series of crossed links of equal length joined to one another at their mid points and at their ends and forming a pattern consisting of a series of similar dia- monds, short blocks slidably fitted in each said slot and attached to the end joints and to uniformly spaced intermediate joints of the corresponding series of crossed links, and a finger button at each end joint of each said series of links, the number of diamonds formed by the links in one of said devices between any two blocks thereof being a multiple of three, the number of diamonds formed by the links in the other said device between any two blocks thereof being a multiple of five.

2. An instrument as described in claim 1, each said block having a transversely extending pointer attached thereto and maintained thereby at right angles to said slots.

References Cited by the Examiner

UNITED STATES PATENTS

| 425,168 | 4/90 | Gale | 33—192 |
| 2,124,550 | 6/38 | Evans | 33—111 |
| 2,422,745 | 6/47 | Ost | 33—192 X |
| 2,871,567 | 2/59 | Casten | 33—75 |

FOREIGN PATENTS

| 430,934 | 6/35 | Great Britain. |

ISAAC LISANN, *Primary Examiner.*